United States Patent [19]
Daum et al.

[11] Patent Number: 6,104,876
[45] Date of Patent: *Aug. 15, 2000

[54] PCI BUS MASTER RETRY FIXUP

[75] Inventors: Daniel Daum, San Jose, Calif.; Jeffrey G. Ort, Kirkland, Wash.

[73] Assignee: Cirrus Logic, Inc., Fremont, Calif.

[*] Notice: This patent is subject to a terminal disclaimer.

[21] Appl. No.: 08/483,583

[22] Filed: Jun. 7, 1995

[51] Int. Cl.[7] .................................................. H01J 3/00
[52] U.S. Cl. ........................ 395/857; 395/287; 395/290; 395/306; 395/835
[58] Field of Search ..................................... 395/287, 292, 395/825, 826, 827, 162, 154, 800, 835, 836, 837, 838, 839, 840, 856, 857, 858, 500, 680, 681, 682

[56] References Cited

U.S. PATENT DOCUMENTS

| | | | |
|---|---|---|---|
| 4,602,327 | 7/1986 | LaViolette et al. | 364/200 |
| 4,706,190 | 11/1987 | Bomba et al. | 364/200 |
| 4,764,862 | 8/1988 | Barlow et al. | 364/200 |
| 5,127,089 | 6/1992 | Gay et al. | 395/325 |
| 5,170,471 | 12/1992 | Bonovento et al. | 395/275 |
| 5,220,674 | 6/1993 | Morgan et al. | 395/800 |
| 5,255,373 | 10/1993 | Brockman et al. | 395/325 |
| 5,317,696 | 5/1994 | Hilgendorf | 395/325 |
| 5,392,422 | 2/1995 | Hoet et al. | 395/550 |
| 5,396,602 | 3/1995 | Amini et al. | 395/325 |
| 5,412,798 | 5/1995 | Garney | 395/500 |
| 5,416,910 | 5/1995 | Moyer et al. | 395/325 |
| 5,418,914 | 5/1995 | Heil et al. | 395/325 |
| 5,420,985 | 5/1995 | Cantrell et al. | 395/325 |
| 5,463,775 | 10/1995 | DeWitt et al. | 395/184.01 |
| 5,535,335 | 7/1996 | Cox et al. | 395/200.11 |
| 5,535,340 | 7/1996 | Bell et al. | 395/292 |
| 5,537,556 | 7/1996 | Mundkur | 395/309 |
| 5,546,546 | 8/1996 | Bell et al. | 395/292 |

*Primary Examiner*—Jack B. Harvey
*Assistant Examiner*—Raymond N Phan
*Attorney, Agent, or Firm*—Robert P. Bell; Steven A. Shaw

[57] ABSTRACT

A technique for providing PCI bus mastering compatibility for legacy PCI bus devices which may not support PCI bus mastering RETRY protocols. DLDMM provider software in a device driver for a target device may provide a callback signal at a callback address to DLDMM client software in a device driver for a bus mastering PCI device. The callback address may be used by the DLDMM client software to signal the bus mastering PCI device to suspend operation in the event of an interrupting event. The bus mastering PCI device may then generate in driver software a RETRY signal to the device driver of the target device. If the interrupting event is over, a signal may be sent by the DLDMM provider software in response to the RETRY signal to the DLDMM client software indicating that the bus mastering device may resume operation. The bus mastering device may then resume operation where left off. The technique of the present invention has particular application to multimedia computer systems where a bus mastering device (e.g., MPEG decoder or the like) may wish to stream MotionVideo™ data to a target adapter (e.g., VGA controller or the like) using bus mastering techniques. Prior art PCI VGA adapters may not support PCI RETRY protocols and thus attempts to send data to such devices using bus mastering may fail.

9 Claims, 3 Drawing Sheets

PCI BUS MASTER RETRY FIXUP

FIELD OF THE INVENTION

The present invention relates to the field of computer devices, particularly devices for use in a PCI type bus system where bus mastering of such devices is permitted. The apparatus and method of the present invention has particular application to multimedia computer systems where data from a multimedia source (e.g., MPEG decoder) may be transferred using PCI bus mastering to a display memory.

BACKGROUND OF THE INVENTION

IBM™ compatible PCs initially were designed around a bus architecture known as Industry Standards Association or ISA bus, which was an asynchronous bus. A more improved bus system, known as the PCI bus has gained popularity in more powerful PCs and notebook computers. The PCI bus is a synchronous data bus and may support a higher data bandwidth than the prior ISA bus designs. To maintain backward compatibility with older "legacy" PC hardware, most PCI bus PCs may be provided with an ISA bus interface and expansion ports.

One powerful feature of the PCI bus architecture is PCI bus mastering. Simply stated, bus mastering allows any device (or one of a number of specified devices) to gain control of the system bus to the exclusion of all other devices, including the host CPU, for data transfer. Bus mastering allows for increased data bandwidth on the bus and also frees up the host CPU for other tasks, as the host CPU is no longer needed to supervise data transfers on the bus.

Multimedia computer designs are increasingly popular. In a multimedia computer, as the name implies, video, graphic and text data may be combined in one multimedia display. Such displays, however, may require a significant amount of data bandwidth to generate. For example a device generating MotionVideo™ data such as an MPEG decoder, may need to transfer such data over a system bus to a display memory of a display controller.

One solution is to use PCI bus mastering as a vehicle to transfer multimedia data over a system bus. Hardware devices may feed data to one another without requiring CPU intervention or using CPU bandwidth. Bus mastering allows the CPU to concentrate on other tasks, such as 3-D rendering, CD-ROM reading, or other intensive operations which enhance the PC platform for game play and user interface. For the purpose of this application, the definition of bus mastering may be narrowed to mean direct streaming of video to VGA memory.

One problem encountered in using PCI bus mastering, is that devices commercially sold as PCI compatible may not be entirely compatible with the PCI standard. In particular, prior art display controllers touted as PCI compatible may not be entirely compatible with all PCI bus protocols. PCI bus VGA adapters or devices are on the market and in use which may not properly arbitrate display memory with a PCI bus master device.

In the PCI bus master protocol, a device attempting to gain control of the bus for the purposes of data streaming to a destination device must first communicate that intention to the destination device. The destination device may respond with an affirmative indication or RETRY indication. An affirmative indication indicates that the destination device is prepared to accept a data stream from a device acting as bus master. A RETRY indication indicates that the destination device is preoccupied, and that the bus master device should retry its request, typically after a predetermined time period.

One problem with prior art PCI bus VGA controllers which may be preoccupied with another task (e.g., bit block transfer) is that this RETRY protocol may not be supported. Early PCI bus VGA controllers which may be preoccupied with another task may not be equipped with a RETRY feature as it may not have been envisioned that such controllers would be destination targets for data streaming. It should be noted that problems of PCI bus devices not being entirely compatible with the PCI standard is not limited to any one manufacturer or any one type of PCI bus device. Moreover, this problem of lack of complete compatibility of PCI bus devices to the PCI bus standard is well known in the art.

Thus, if a PCI device attempts to take control of the bus and stream data to a prior art PCI bus VGA controller, such attempts may or may not work, depending upon the make and model (and vintage) of a user's VGA controller. If the RETRY protocol is not supported by the VGA controller, attempts to stream data to that controller as a target device may result in system crash or erratic results.

One prior art solution to this problem has been to instruct the user to replace his or her PCI bus display controller card or IC with an upgraded version. However, such a solution may be unworkable. If a producer of multimedia components (such as upgrade kits, cards or the like) wishes to market such products, they must be compatible with at least a substantial portion of "legacy" products. Multimedia products in general have suffered from such user frustrations, as users are generally not prepared to scrap their investment in PC hardware (especially that of recent vintage) merely to install a new multimedia device.

SUMMARY AND OBJECTS OF THE INVENTION

Driver software for a data target device generates a callback signal indicating whether the data target device is busy. Driver software for a data source device receives the callback signal and suspends operation of the data source device.

Driver software for the data source device generates a retry signal in response to a callback signal indicating the data target device is busy and outputs the retry signal to the driver software for the data target device. Driver software for the data target device generates a response only when it is again available to receive data. Operation of the data source device may then be resumed at a point where the data source device was suspended.

A computer system includes a system bus for transferring data, a data target device, and first driver software for monitoring status of the data target device and generating a callback signal indicating whether the data target device is busy. A data source device, coupled to the system bus, outputs data to the system bus. A second driver software receives the callback signal and controls the data source device in response to said callback signal.

The second driver software suspends operation of the data source device when it receives the callback signal. The second driver software generates a retry signal and outputs the retry signal to first driver software in response to a callback signal indicating the data target device is busy. The first driver software generates, in response to a received retry signal, a callback signal only when it is available to receive data. The second driver software resumes operation of the data source device at a point where the data source device was suspended.

It is therefore an object of the present invention to provide support for bus mastering in a computer system where devices may not support bus mastering requests.

It is a further object of the present invention to provide a solution for PCI bus computer systems where devices on the PCI bus do not support all features of the PCI specification.

It is a further object of the present invention to provide a technique for streaming data from a device on a PCI bus acting as a bus master to a device on the PCI bus which may not support PCI bus mastering protocols.

It is a further object of the present invention to improve performance of a multimedia type computer system by allowing a MPEG decoder to bus master on a PCI bus to stream data to a display controller device which may not support bus mastering protocols.

BRIEF DESCRIPTIONS OF THE DRAWINGS

DETAILED DESCRIPTION OF THE INVENTION

Figure 1:
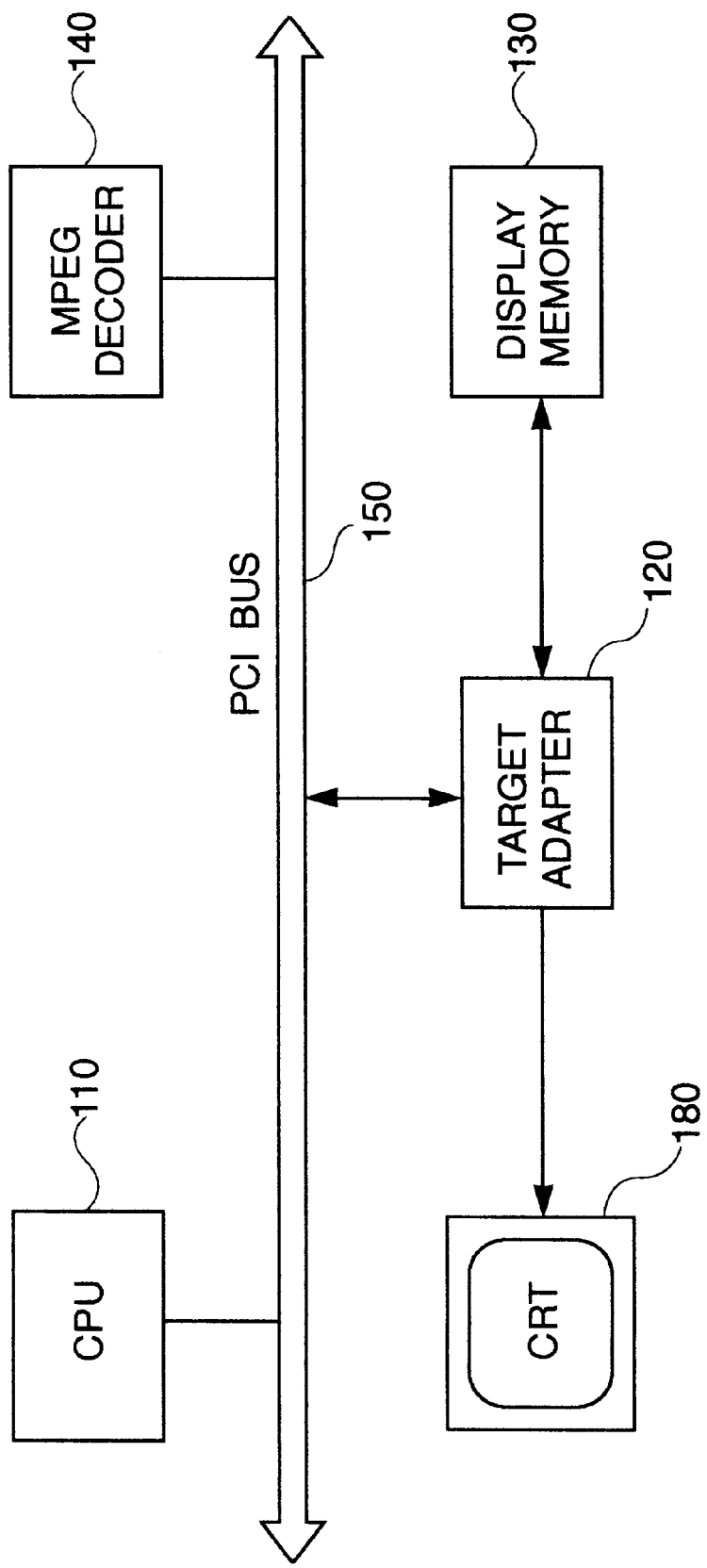
FIG. 1 is a block diagram of a portion of multimedia computer system using a PCI bus.

FIG. 1 is a block diagram of a portion of a multimedia computer system using a PCI bus. In FIG. 1, host CPU 110 may be coupled to a PCI bus 150 for transferring data to and from the bus to other devices on the bus. In the PCI specification, a device on PCI bus 150 other than host CPU 110 may gain control of PCI bus 150 to the exclusion of all other devices. One such bus mastering device may be MPEG decoder 140. MPEG decoder 140 may be provided to decode data received from a data source (e.g., CD-ROM or the like) to produce MotionVideo™ images and corresponding audio. MPEG decoder 140may transfer MotionVideo™ image data in the form of a frame of MotionVideo™ window data to display memory 130 of target adapter 120.

Target adapter 120 may comprise a VGA type display controller or the like configured as a PCI bus device. Target adapter 120 periodically refreshes a display such as CRT 180 using data stored in display memory 130. Display memory 130 may also be conventionally referred to as video memory (VMEM) and may comprise a single-port DRAM or the like. With the advent of multi-media displays incorporating full-motion video such as MotionVideo™, the term "video memory" may now be a misnomer. Thus, for the purposes of this application, memory 120 will be referred to as display memory 130.

Target adapter 120 and MPEG decoder 140 may each be provided with driver software packaged with the hardware products. Such driver software for a target adapter may incorporate direct level display memory manager (DLDMM) software for arbitrating and managing hardware resources. DLDMM software may arbitrate such resources as zooming and color conversion capabilities within a target adapter, which significantly reduces the amount of data being driven over the bus.

Data rates required for transmitting MotionVideo™ data may be rather high. Table I illustrates data rate in Megabytes per second of target adapter 120 without built-in zoom or color conversion features, as well as for target adapter 120 provided with an enhanced video graphics adaptor with zoom and color conversion features. Target adapter 120 may comprise a display controller or graphics controller such as a Video Graphics Controller (VGA), SVGA, or the like. Other types of display controllers or graphics controllers may be utilized as target adapter 120 within the spirit and scope of the present invention.

The sample window size for Table I is a MotionVideo™ window having a resolution of 352×288 pixels at 30 frames per second, for various pixel depths. MotionVideo™ refers to the use of live or full-motion video images or clips in a multi-media computer system. Aspects of MotionVideo™ and Motion Video Architectures (MVA™) are described, for example, in co-pending applications Ser. No. 08/235,764, filed Apr. 29, 1994, entitled "VARIABLE PIXEL DEPTH AND FORMAT FOR VIDEO WINDOWS", and Ser. No. 08/359,315, filed Dec. 19, 1994, entitled "MEMORY BANDWIDTH OPTIMIZATION", both of which are incorporated herein by reference.

A resolution of 352×288 pixels at 30 frames per second is also a PAL resolution MPEG encoded clip window size and frame rate. The left hand side of Table I illustrates the increase in data rates as deeper color depths (i.e., pixel depth in bits per pixel or bpp) and zoom factors are considered when target adapter 120 is not provided with zoom and color conversion features.

TABLE I

|  | Non Zoom/Color Converting VGA | | | | Zoom/Color Converting VGA | | | |
| --- | --- | --- | --- | --- | --- | --- | --- | --- |
|  | 1x | 2x | 3x | 4x | 1x | 2x | 3x | 4x |
| 8 bpp | 2.9 | 11.6 | 26.1 | 46.4 | 2.9 | 2.9 | 2.9 | 2.9 |
| 16 bpp | 5.8 | 23.2 | 52.2 | 92.8 | 2.9 | 2.9 | 2.9 | 2.9 |
| 24 bpp | 8.7 | 34.8 | 78.3 | 139.2 | 8.7 | 8.7 | 8.7 | 8.7 |
| 32 bpp | 11.6 | 46.4 | 104.4 | 185.6 | 11.6 | 11.6 | 11.6 | 11.6 |

In prior art devices, typical bus mastering throughput falls within a range of 10 to 24 Megabytes per second. As illustrated in Table I, such a data rate may not support all possible pixel depths and zoom modes if target adapter 120 is not provided with zoom capability or color conversion. To alleviate this burden, target adapter 120 may be required to provide zooming capability, effectively maintaining realistic data transfer rates equivalent to the 1x zoom column, as illustrated in the right hand side of Table I. Further bandwidth usage may be preserved by providing 8-bit color space compression technology (e.g, 4-2-2 YUV, AccuPak™ or the like) which approaches higher bit rate quality while actually reducing the number of bytes transferred. Data on the right hand side of Table I illustrates the large reduction in data transfer rate where target adapter 120 is provided with enhanced features such as zoom and color conversion.

Regardless of whether zooming or color conversion is provided in target adapter 120, the bus interface of target adapter 120 must be fast. All bus cycles (eight, sixteen, and thirty-two bit) should be optimized for speed. Burst mode may also be enabled for system throughput. If target adapter 120 is too slow to accept massive amounts of data, the frame rate may not be fast enough to satisfy the user, resulting in jerky video images, or inconsistent results.

Some target adapters 120 may be provided with a bit block transfer (blt) engines built into them. Typically, modern PCI bus VGA controllers are provided with a blt engine within the controller. If the blt engine of target adapter 120 is busy, display memory 130 may not be accessed, and target adapter 120 is essentially "busy". The PCI specification provides for such a situation by having a RETRY protocol. If target adapter 120 is busy or unable to accept data, for example, from MPEG decoder 140, it may inform PCI bus 150 that while the data to be transferred is within the address range of target adapter 120, target adapter 120 is unable to accept transfer at the moment.

A programmable retry period may pass by, and another attempt may be made to get the data to target adapter 120. This sequence may occur over and over again unit target adapter 120 accepts data from MPEG decoder 140. The same will occur if the device is in some form of extended write mode, if, say transparency operation is being executed.

However, the concept of a double aperture needs to be present in target adapter 120 in order for the retry feature of the PCI bus to be successful. If a system to screen blt operation is being performed by target adapter 120, and a blt engine is taking CPU data off the bus, it may arbitrate which data to retry and which data to accept for the blt engine.

One problem facing a consumer is that purchasing a PCI system or adaptor does not guarantee PCI bus mastering functionality. Target adapter 120may not be provided with the resources to support PCI bus retry protocols. A large majority of systems today have slow PCI interfaces and the blt engine may consume the bandwidth of the target device, rendering it unavailable to MPEG decoder 140. However, retry or double aperture architecture may not be supported in such devices.

In the present invention, these issues may be handled in software through a direct level display memory managers (DLDMM). One example of a DLDMM is the Display Control Interface (DCI), which various manufacturers such as Microsoft™ and Intel™ have developed for various operating systems. For Windows 3.1x, the DLDMM may be known as Display Control Interface™ (DCI). For Windows™ NT™, the DLDMM may be known as Direct Draw™. OS/2™ systems may use a DLDMM known as Endive™. Apple™ MacIntosh™ systems use similar DLDMM type interfaces.

The MS-DOS™ platform may be mainly used as a game environment. Game programs may rely on VESA BIOS Extensions to manipulate the target's memory map. VBE 2.0 provides a linear address interface for each mode, however there is no specific standard call for a device's blt engine. Thus managing the blt and bus master may be a non-issue.

Figure 2:
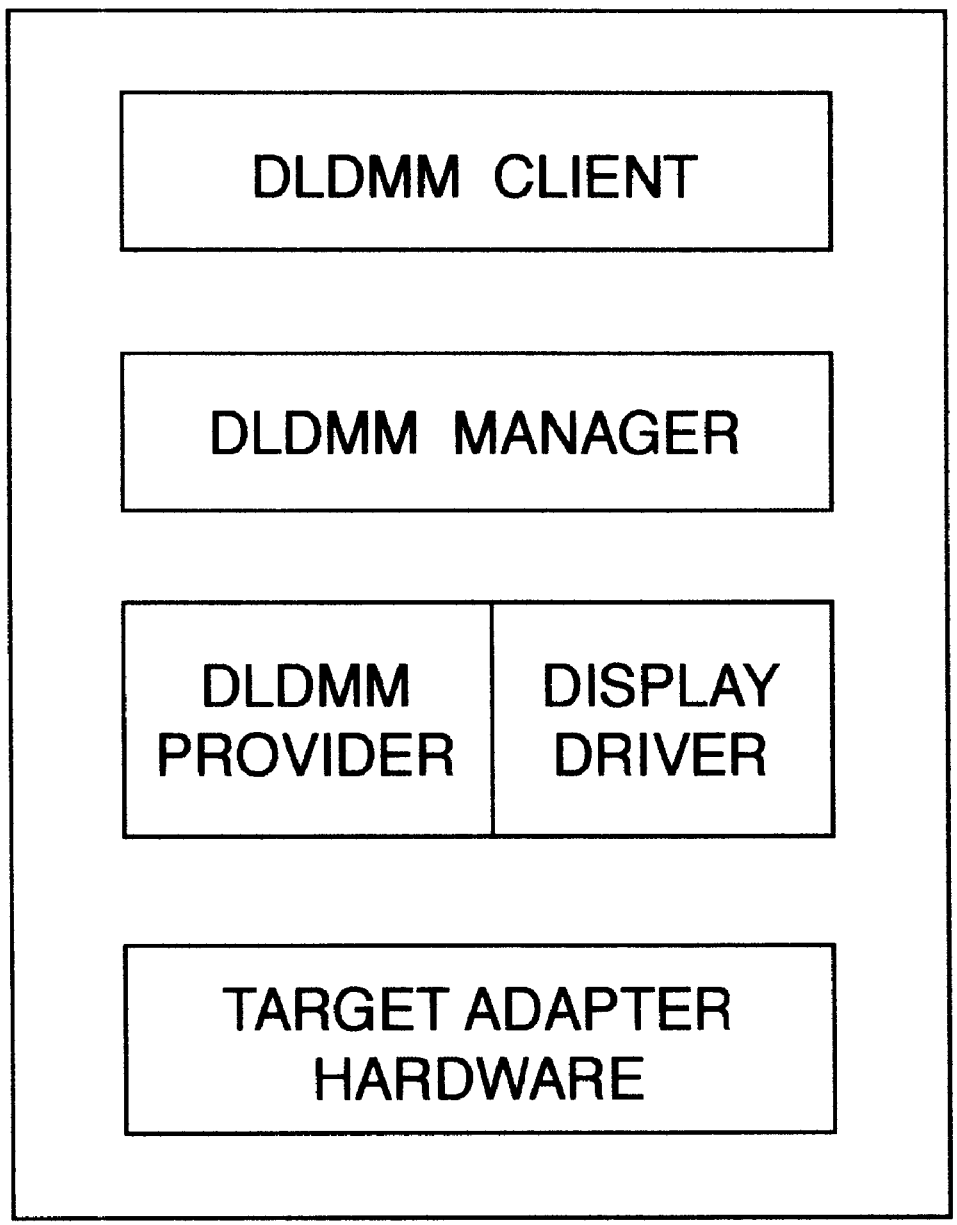
FIG. 2 is a diagram illustrating the relationship of various components of a Display Control Interface with target adapter hardware.

DLDMM architecture, as illustrated in FIG. 2, is a layered approach where DLDMM provider and display driver software may be supplied by a hardware manufacturer (e.g., target adapter 120 manufacturer) bundled in a device driver or the like. DLDMM manager software may be provided by the operating system of host CPU 110 (e.g., DOS, Windows 3.1, Windows NT, OS/2, or the like). DLDMM client software 171 may be shipped by a hardware manufacturer (e.g., MPEG decoder 140 manufacturer) bundled in a device driver or the like. In the present invention, it is the software which interacts with the DLDMM to deliver bus mastered data to target adapter 120.

Figure 3:
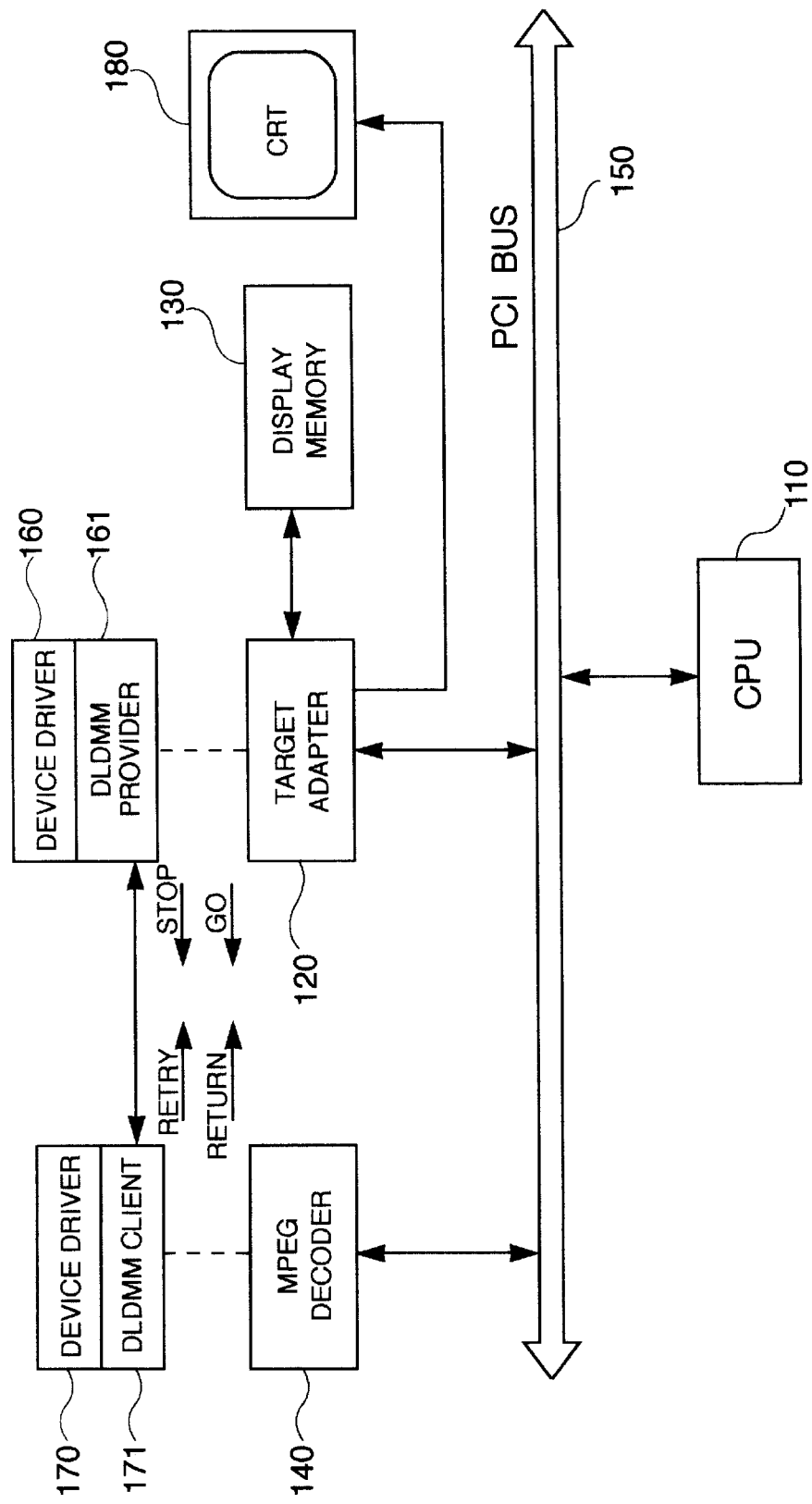
FIG. 3 is a block diagram illustrating the relationship between hardware in a multimedia computer system and components of a Display Control interface.

FIG. 3 illustrates the relationship between the components of the Direct Level Display Memory Manager (DLDMM) and elements of a multimedia computer system. DLDMM client software 171 and host operating system (a DLDMM client itself) may arbitrate access to target device 120 by controlling who owns target device 120 at any one time. Software calls to lock access may be made on a video frame by frame basis. In an alternative embodiment, DLDMM client software 171 may deliver asynchronous data to target adapter 120 DLDMM provider software 161 without any calls to lock the surface down. In the alternative embodiment, bus mastering MPEG decoder 140 DLDMM client software 171 may sit in the background, streaming data to a linear destination, only to be interrupted or called back only when necessary (e.g., a window has moved or a window occlusion has occurred or access to display memory 130 of target adapter 120 may be preoccupied). DLDMM software in its present form may take care of these problems by calling back DLDMM client software 161.

It may not be desirable to have bus mastering MPEG decoder 140 register ownership to target adapter 120, as such ownership may block operating systems and other client access. Bus mastering MPEG decoder 140 may instead share access with the operating system of host CPU 110 until target adapter 120 is in a situation where sharing may no longer occur. Such is the case for a non-PCI retry double aperture adapter. DLDMM software may be provided with a work around to be able to have another callback to suspend and resume a bus mastering client, such as MPEG decoder DLDMM client software 171.

Bus mastering MPEG decoder 140, acting as bus master may stream data to target adapter 120 over PCI bus 150. If host CPU 110l requests and an event (blt operation) from target adapter 120 via device driver 160, MPEG decoder 140 may be suspended (analogous to being put into a retry mode) until the non-sharing event ended. When suspend event (e.g., blt operation) is detected by DLDMM provider software 161 within display driver 160, a callback signal is sent to DLDMM client software 171 within device driver 170 of MPEG decoder 140 to suspend operation of MPEG decoder 140, as indicated by STOP arrow in FIG. 3. This callback address may act as a substitute in software for the RETRY protocol of the PCI bus. Note that in the embodiment of FIG. 3, it may be irrelevant whether target device 120 supports the PCI bus RETRY protocol, as the callback address may supersede such a protocol by suspending operation of MPEG decoder 140.

Once MPEG decoder 140 DLDMM client 171 receives this callback, it will immediately try to gain access to display memory 130 via DLDMM provider 161 as indicated by the RETRY arrow in FIG. 3. DLDMM provider 161 may then make inquiries to target adapter 120 to determine whether the bit block transfer is completed.

Once the suspend event (e.g., blt operation) has ended, a resume callback (GO arrow in FIG. 3) may be made by DLDMM provider software 161 within display driver 160 within target adapter 120 to DLDMM client software 171 within device driver 170 of MPEG decoder 140. DLDMM client 171 may return, as indicated by the RETURN arrow in FIG. 3, from the original stop callback and device driver 160 of target adapter 120 may return from the offending software bit-blt call by the host CPU's operating system.

Aperture selection (video retry path versus normal writes) may be arbitrated through DLDMM client/provider interaction. DLDMM provider software 161 within display driver 160 may return a linear address to DLDMM client software 171 representing where windowed data writes should occur. DLDMM client software 171 may need only to be informed to choose a correct aperture. If DLDMM client software 171 requests a shared surface type, DLDMM provider software 161 within display driver 160 may interpret such a request as from a bus mastering client, and use the retry aperture as opposed to the normal CPU path aperture.

One advantage of the present invention is that a consumer is ensured that regardless of which PCI adapter is present in the system, or whatever PCI adapter is purchased in the future, the overall system will function properly regardless of whether these PCI devices support PCI RETRY protocols. It may be possible that some efficiency may be lost through a software work around. If the case of the blt operation is considered again, software may tell if the operation is done (so that it may tell the bus mastering client to continue to stream) by polling the target adapter with I/O and holding onto the CPU until the operation is done.

While the preferred embodiment and various alternative embodiments of the invention have been disclosed and described in detail herein, it may be obvious to those skilled in the art that various changes in form and detail may be made therein without departing from the spirit and scope thereof.

For example, while illustrated here as being utilized for a multimedia computer where data is to be streamed from an MPEG decoder to a target adapter, the technique of the present invention may also be applied to other devices attached to a PCI bus, where bus mastering RETRY protocols have not been supported. Moreover, the technique of the present invention may also be applied to other types of bus systems where similar protocols are not supported in hardware devices.

Similarly, while the techniques of the present invention haven been illustrated for an MPEG type decoder, other types of data sources and video decoders may be utilized without departing from the spirit and scope of the invention.

In addition, while the techniques of the present invention have been illustrated as a specific callback mechanism, other types of software retry schemes may be similarly utilized without departing from the spirit and scope of the present invention.

What is claimed is:

1. A method for controlling streaming of data from a data source device to a data target device on a system bus, comprising the steps of:

monitoring, in driver software for a data target device, status of the data target device, generating, in driver software for a data target device, a first callback signal indicating monitored status of the data target device, receiving, in driver software for the data source device, the first callback signal, suspending bus master control of the data source device when the first callback signal indicates the data target device is busy, generating, in driver software for the data source device, a retry signal in response to the first callback signal, when the first callback signal indicates the data target device is busy, outputting, from the driver software of the data source device, the retry signal to the driver software for the data target device, generating, in response to a retry signal received by the driver software for the data target device, a second callback signal indicating monitored status of the data target device, resuming bus master control of the data source device at a point where the data source device was suspended if the second callback signal indicates the data target device is not busy, and streaming data to the data target device over the system bus from the data source device.

2. The method of claim 1, wherein said data source device is a video decoder and said data target device is a display controller having a display memory and said step of streaming data comprises the step of streaming video data to the display memory of the display controller.

3. The method of claim 1, further comprising the steps of:

generating, in driver software for the data source device, a further retry signal in response to the second callback signal, when the second callback signal indicates the data target device is busy, outputting, from the driver software of the data source device, the further retry signal to the driver software for the data target device, generating, in response to the further retry signal received by the driver software for the data target device, a further callback signal indicating monitored status of the data target device, resuming bus master control of the data source device at a point where the data source device was suspended if the further callback signal indicates the data target device is not busy, and streaming data to the data target device over the system bus from the data source device.

4. A computer system, comprising:

a system bus for transferring data;

a data target device, coupled to the system bus for receiving data from the system bus;

first driver software coupled to the data target device for monitoring status of the data target device and generating a first callback signal indicating monitored status of the data target device, said first driver software further generating, in response to a received retry signal, a second callback signal indicating monitored status of the data target device;

a data source device, coupled to the system bus, for streaming data over the system bus using bus master control to the data target device; and second driver software coupled to the data source device for receiving the first callback signal and controlling the data source device in response to said first callback signal, said second driver software suspending bus master control of the data source device if the first callback signal indicates the data target device is busy, and generating and outputting a retry signal to said first driver software in response to a first callback signal indicating the data target device is busy, said second driver software resuming bus master control to the source device and streaming of the data from the source device from a point where the data source device was suspended if the second callback signal indicates that the data target device is not busy.

5. The computer system of claim 4, wherein said system bus is a PCI system bus.

6. The computer system of claim 5, wherein said data source device is a video decoder and said data target device is a display controller having a display memory, wherein said video decoder streams video data to the display memory of the display controller.

7. The computer system of claim 4, wherein:

said first driver software generates further callback signals indicating monitored status of the data target device in response to further received retry signals; and said second driver software receives the further callback signals and generates and outputs further respective retry signals to said first driver software in response to further callback signal indicating the data target device is busy until a received further callback signal indicates the data target device is not busy, said second driver software resuming bus master control to the source device and streaming of the data from the source device from a point where the data source device was suspended if a further callback signal indicates that the data target device is not busy.

8. A method for controlling streaming of data from a data source device to a data target device on a system bus, comprising the steps of:

(a) monitoring, in driver software for a data target device, status of the data target device, (b) generating, in driver software for a data target devices a callback signal indicating monitored status of the data target device, (c) receiving, in driver software for the data source device, the callback signal, (d) suspending bus master control of the data source device when the callback signal indicates the data target device is busy, (e) generating, in driver software for the data source device, a retry signal in response to the callback signal, when the callback signal indicates the data target device is busy, (f) outputting, from the driver software of the data source device, the retry signal to the driver software for the data target device, (g) repeating step (a) in response to the retry signal, (h) repeating steps (b)–(f) until the callback signal indicates that the data target device is not busy, and (i) if the callback signal indicates the target data device is not busy, resuming bus master control of the data source device at a point where the data source device was suspended and streaming data to the data target device over the system bus from the data source device.

9. A computer system, comprising:

a system bus for transferring data;

a data target device, coupled to the system bus for receiving data from the system bus;

first driver software coupled to the data target device for monitoring status of the data target device and initially generating a callback signal indicating monitored status of the data target device, said first driver software further generating, in response to a received retry signal, the callback signal indicating monitored status of the data target device;

a data source device, coupled to the system bus, for streaming data over the system bus using bus master control to the data target device; and second driver software coupled to the data source device for receiving the callback signal from the first driver software and controlling the data source device in response to said callback signal, said second driver software suspending bus master control of the data source device if the callback signal indicates the data target device is busy, and repeatedly generating and outputting a retry signal to said first driver software in response to the callback signal indicating the data target device is busy until a callback signal is received from the data target device indicating that the data target device is not busy, said second driver software resuming bus master control to the source device and streaming of the data from the source device from a point where the data source device was suspended if the callback signal indicates that the data target device is not busy.

* * * * *